(12) United States Patent
Tanioka

(10) Patent No.: US 6,872,047 B2
(45) Date of Patent: Mar. 29, 2005

(54) STEAM-COOLING-TYPE TURBINE

(75) Inventor: Tadateru Tanioka, Hyogo (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 343 days.

(21) Appl. No.: 10/084,455

(22) Filed: Feb. 28, 2002

(65) Prior Publication Data
US 2002/0150467 A1 Oct. 17, 2002

(30) Foreign Application Priority Data
Apr. 11, 2001 (JP) ........................................ 2001-113024

(51) Int. Cl.[7] ................................................. F01D 9/06
(52) U.S. Cl. ........................ 415/114; 415/118; 415/115; 415/135
(58) Field of Search ................................. 415/114, 115, 415/116, 117, 118, 135, 136, 96 R; 416/96 R

(56) References Cited

U.S. PATENT DOCUMENTS 5,865,598 A * 2/1999 Twerdochlib ............... 415/118
6,230,483 B1 * 5/2001 Sakon et al. ................. 60/806

FOREIGN PATENT DOCUMENTS

| EP | 0 979 932 | 2/2000 |
| EP | 1 249 591 | 10/2002 |
| JP | 10-306702 | 11/1998 |
| JP | 10-317904 | 12/1998 |
| JP | 11-182205 | 7/1999 |

* cited by examiner

Primary Examiner—Edward K. Look
Assistant Examiner—Kimya N McCoy
(74) Attorney, Agent, or Firm—Oblon, Spivak, McClelland, Maier & Neustadt, P.C.

(57) ABSTRACT

The steam-cooling-type gas turbine is provided with communication passages in number equal to that of the front-stage stator blades and the rear-stage stator blades. Many communication passages are placed in the blade ring densely. As a result, in the blade ring, the temperature difference between the portion having the communication passages and the portion without the communication passages becomes smaller. This makes it possible to minimize the thermal deformation of the blade ring, thereby making it possible to provide uniform clearance between the fixed side such as the blade ring and the rotary side members.

8 Claims, 13 Drawing Sheets

STEAM-COOLING-TYPE TURBINE

FIELD OF THE INVENTION

The present invention relates to a steam-cooling-type gas turbine that cools stator blades by cooling stream. More particularly, this invention relates to a steam-cooling-type gas turbine that can maintain a clearance evenly between a blade ring, etc., on the fixed side and a moving blade on the rotator side.

BACKGROUND OF THE INVENTION

A conventional steam-cooling-type gas turbine has been disclosed in, for example, Japanese Patent Application Laid-Open No. 11-182205 filed by the applicant of the present invention. The steam-cooling-type gas turbine described in this reference will be explained with reference FIG. 12 and FIG. 13.

In FIG. 12, reference numeral 100 indicates a blade ring. The blade ring 100 is provided with one-half ring-shape members that are longitudinally combined so as to be detachably attached to each other, thereby forming a ring shape. In the blade ring 100, plurality of (for example, 32) front-stage stator blades (for example, first-stage stator blades) 101 and a rear-stage blade (for example, 2nd-stage stator blade) 102 are arranged in a ring shape. A 3rd-stage stator blade, a 4th-stage stator blade, a 5th-stage stator blade, and so no are arranged in a ring shape in the steam-cooling-type gas turbine.

The blade ring 100 has an integral structure in which the portion on which the front-state blades 101 are arranged and the portion on which the rear-stage stator blade 102 are arranged are integrally formed into one part. In the steam-cooling-type gas turbine, in addition to the blade ring integral structure, there is another structure, that is, a blade ring separated structure in which the blade ring having the front-stage blades arranged thereon and the blade ring having the rear-stage blades arranged thereon are provided as separated members, with the blade ring on the front-stage stator blade side and the blade ring on the rear-stage stator blade side being connected by another member.

The blade ring 100 is provided with a steam supplying passage 103, a steam communication passage 104 and a steam recovering passage 105 respectively. At least one set of the steam supplying passage 103, the steam communication passage 104 and the steam recovering passage 105 is provided in the one-half ring-shaped blade ring 100. Further, cooling steam passages 106 and 107 are respectively formed in each of the front-stage stator blades 101 and the rear-stage stator blades 102.

A first branch pipe 108, a second branch pipe 109, a third branch pipe 110 and a fourth branch pipe 111 are respectively placed between the steam supplying passage 103 and the cooling steam passage 106 of the front-stage stator blades 101, between the steam communication passage 104 and the cooling steam passage 106 of the front-stage stator blades 101, between the steam communication passage 104 and the cooling steam passage 107 of the rear-stage stator blades 102, and between the steam recovering passage 105 and the cooling steam passage 107 of the rear-stage stator blades 102.

The blade ring 100 is supported by a not shown casing. A not shown rotor side is attached to the casing so as to be freely rotate thereon, and a moving blade (for example, first-stage moving blade) 112 is placed in a ring shape.

The moving blade 112 is placed on the downstream side of the stator blades 101, 102. The moving blade 112 is placed between-the front-stage stator blade 101 and the rear-stage stator blade 102. Moreover, the chip of the moving blade 112 on the rotary side is allowed to face the blade ring 100 on the fixed side with a clearance 113 in between. It is essential to maintain the clearance 113 evenly so as to improve the efficiency of the gas turbine.

When the steam-cooling-type gas turbine is driven, a high-temperature, high-pressure combustion gas (not shown) is allowed to pass through the front-stage blades 101, the moving blade 112 and the rear-stage stator blade 102 so that the moving blade 112 and the rotor side are rotated to generate a torque.

Cooling steam, indicated by a solid-line arrow in FIG. 12, is supplied to the steam supplying passage 103. Then, the cooling steam is distributed from the steam supplying passage 103 to the respective cooling steam passages 106 of the front-stage stator blades 101 through the first branch pipe 108. The cooling steam thus distributed is allowed to cool the front-stage stator blades 101 through the respective steam passage 106.

The cooling steam that has cooled the front-stage stator blades 101 is concentrated into the steam communication passage 104 through the second branch pipe 109, and again distributed to the respective cooling steam passage 107 of the rear-stage stator blades 102 from the steam communication path 104 through the third branch pipe 110. The cooling steam, thus distributed, is allowed to cool the rear-stage stator blades 102 through the respective cooling steam passages 107.

The cooling steam that has cooled the rear-stage stator blades 102 is again concentrated on the steam recovering passage 105 through the fourth branch pipe 111, and recovered from the steam recovering passage 105. The steam thus recovered is recycled.

The conventional steam-cooling-type gas turbine is arranged so as to communicate the cooling steam passage 106 on the front-state stator blades 101 (for example, 8 to 16) side and the cooling steam passage 107 on the rear-state stator blades 102 (for example, 8 to 16) with each other collectively through a single steam communication passage 104.

For this reason, as illustrated in FIG. 13, the number of the steam communication passage 14 is fewer and arranged in the blade ring 100 in a scattered manner. Consequently, of the blade ring 100, the portion having the steam communication passage 104 has a higher temperature, while the portion without this passage has a lower temperature, with a great temperature gap. The thermal deformation of the blade ring 100 becomes greater due to the irregularity of temperature distribution having a great temperature gap, resulting in an uneven clearance 113 between the blade ring 100 on the fixed side and the moving blade 112 on the rotary side.

Besides the steam-cooling-type gas turbine of the blade ring integrated structure, the problem is commonly seen in the steam-cooling-type gas turbine of the blade ring separated structure.

SUMMARY OF THE INVENTION

It is an object of the present invention to provide a steam-cooling-type gas turbine which can maintain an even clearance between the blade ring, etc. on the fixed side and the moving blade on the rotary side.

In the steam-cooling-type gas turbine according to the present invention, each of the cooling passages of the front-stage stator blades and each of the cooling passages of the rear-stage stator blades are allowed to communicate with each other through a single communication passage in a one-to-one correspondence.

Thus, the communication passages the number of which is the same as that of the front-stage stator blades and the rear-stage stator blades are placed so that more communication passages are closely arranged on the fixed side having the blade ring, etc. Consequently, on the fixed side having the blade ring, etc., the temperature difference between the portion having the communication passages and the portion without the communication passages becomes smaller. The evenly adjusted temperature distribution with a small temperature gap makes the thermal deformation on the fixed side having the blade ring, etc. smaller, thereby providing an evenly adjusted clearance between the fixed side having the blade ring, etc. and the moving blade on the rotary side.

Other objects and features of this invention will become apparent from the following description with reference to the accompanying drawings.

DETAILED DESCRIPTIONS

Embodiments of the steam-cooling-type gas turbine according to the present invention will be explained with reference to FIG. 1 through FIG. 11. However, the steam-cooling-type gas turbine of the present invention is not intended to be limited by these embodiments.

Figure 1:
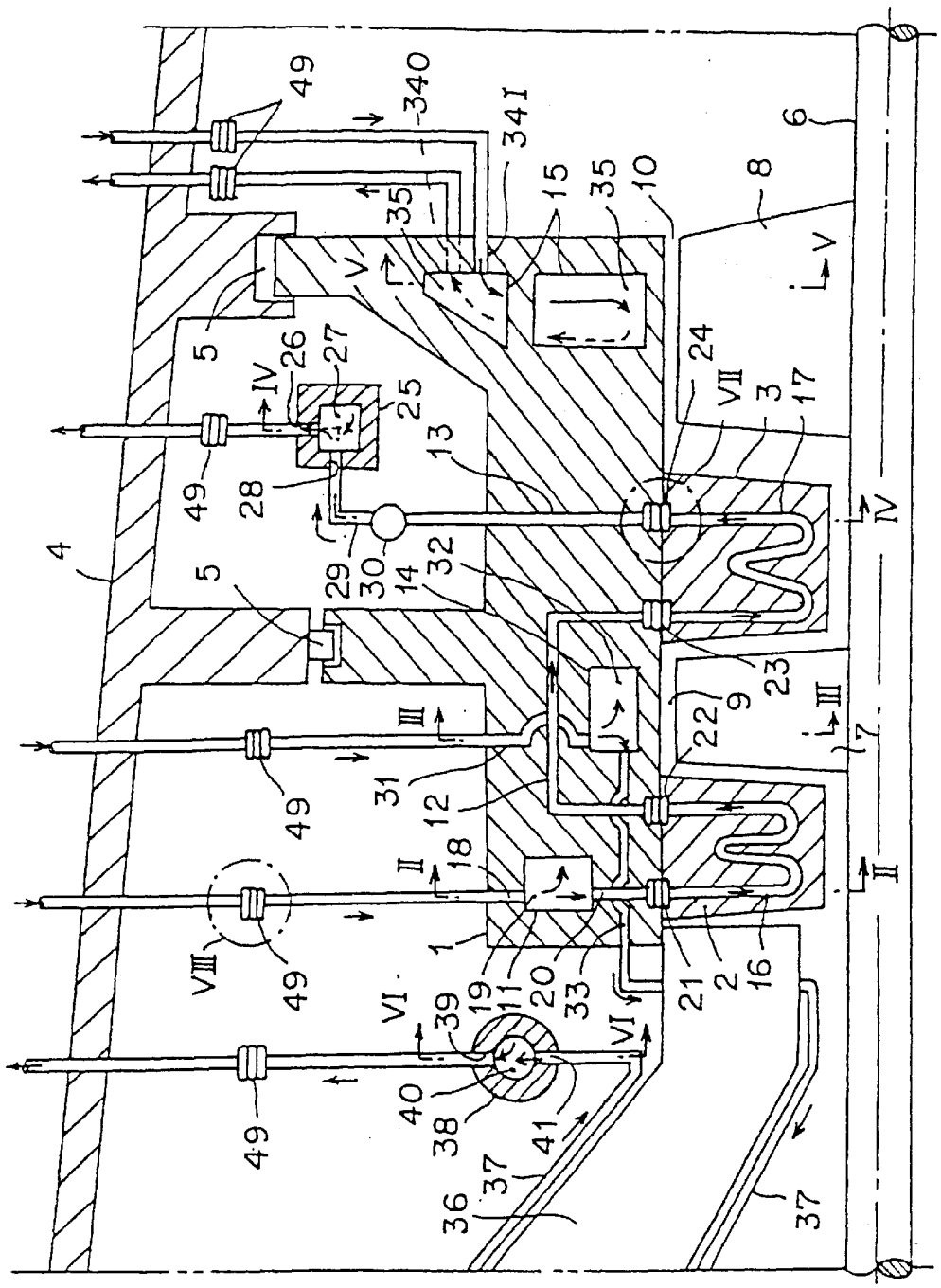
FIG. 1 is a partial longitudinal cross-sectional view which shows the outline of a first embodiment of a steam-cooling-type gas turbine of the present invention.

FIGS. 1 through 10 show a first embodiment of the steam-cooling-type gas turbine according to the present invention. In FIG. 1, reference numeral 1 indicates a blade ring. The blade ring 1 is provided with one-half ring-shape members that are longitudinally combined so as to be detachably attached to each other to form a ring shape. In the blade ring 1, a plurality of (for example, 32) front-stage stator blades (for example, first-stage stator blades) 2 and a rear-stage blade (for example, 2nd-stage stator blade) 3 are arranged in a ring shape respectively. A 3rd-stage stator blade, a 4th-stage stator blade, a 5th-stage stator blade, and so on are arranged in a ring shape in the steam-cooling-type gas turbine.

The blade ring 1 has an integral structure in which the portion on which the front stage blades 2 are arranged and the portion on which the rear-stage stator blade 3 are arranged are integrally formed into one part. The blade ring 1 is supported by the supporting unit 5 to the casing 4 so as to be allowed to shift in three directions (in the axis direction, radial direction and circumferential direction of the rotor 6 which will be described later).

A rotor 6 is attached to the casing 4 so as to freely rotate thereon. In the rotor 6, a front-stage moving blade (for example, first-stage moving blade) 7 and a rear-stage moving blade (for example, second-stage moving blade) 8 are respectively arranged in a ring shape. A 3rd-stage stator blade, a 4th-stage stator blade, a 5th-stage stator blade, and so no are arranged in a ring shape in the steam-cooling-type gas turbine.

The front-stage moving blade 7 and the rear-stage moving blade 8 are aligned on the rear stream side of the front-stage stator blade 2 and the rear-stage stator blade 3. The chips of the front-stage moving blade 7 and the rear-stage moving blade 8 on the rotary side are allowed to face the front blade ring 1 with respective clearances 9 and 10.

The blade ring 1 is provided with a supply passage 11, a communication passage 12, a recovery passage 13, a warming-up and cooling use passage 14 and a warming-up passage 15. Cooling passages 16 and 17 are respectively formed in a plurality of the front-stage stator blades 2 and the rear-stage stator blades 3.

Figure 2:
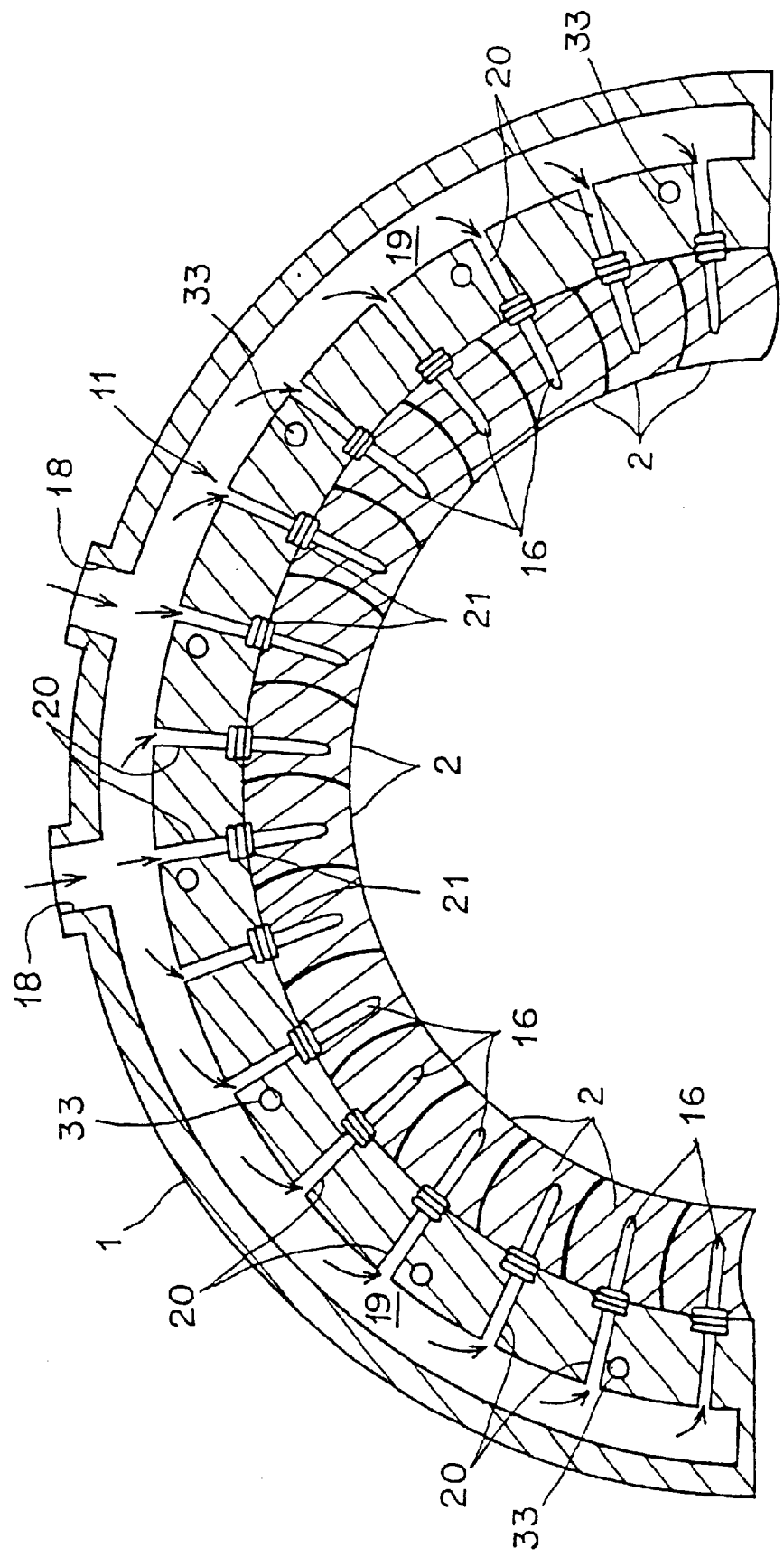
FIG. 2 is a cross-sectional view taken along line II—II in FIG. 1.

As illustrated in FIG. 2, the supply passage 11 has a manifold structure constituted by two supply passages 18, one supply communication path 19 and supply branch passages 20 that are installed in the blade ring 1 having the one-half ring shape. The supply branch passages 20 and the cooling passage 16 of the front-stage stator blade 2 are connected to each other through a first flexible connecting pipe 21.

Figure 3:
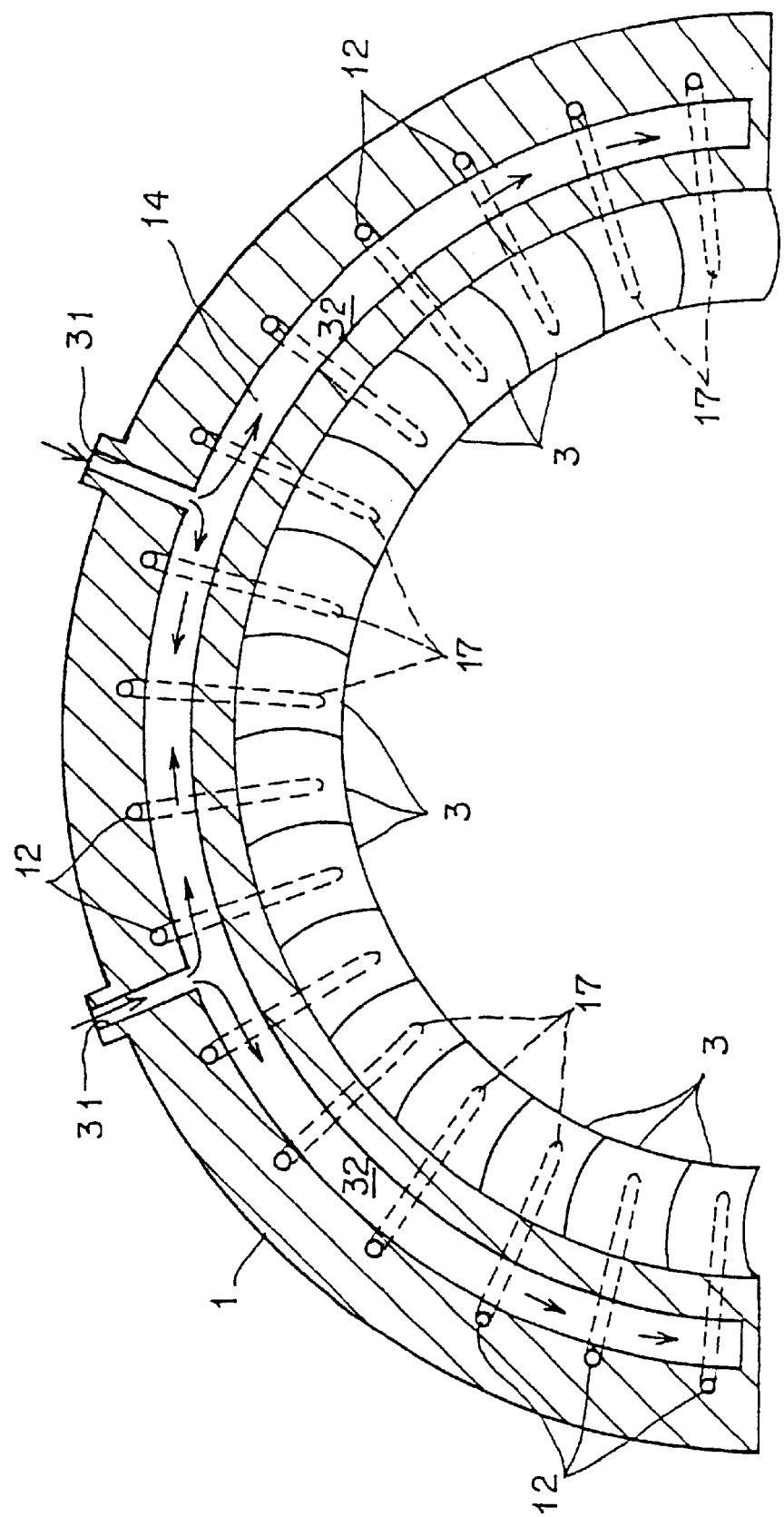
FIG. 3 is a cross-sectional view taken along line III—III in FIG. 1.

As illustrated in FIG. 3, the communication passages 12 the number of which is sixteen are attached to the blade ring 1 having the one-half ring shape. The communication passages 12 and the cooling passages 16 of the front-stage stator blade 2 are connected through a second flexible connecting pipe 22. Moreover, the communication passages 12 and the cooling passages 17 of the rear-stage stator blade 3 are connected to each other through a third flexible connecting pipe 23. Consequently, the cooling passages 16 of a plurality of the front-stage stator blade 2 and the cooling passages 17 of a plurality of the rear-stage stator blade 3 are respectively allowed to communicate with each other through the communication passages 12 in a one-to-one correspondence. This has a so-called single-through construction.

Figure 4:
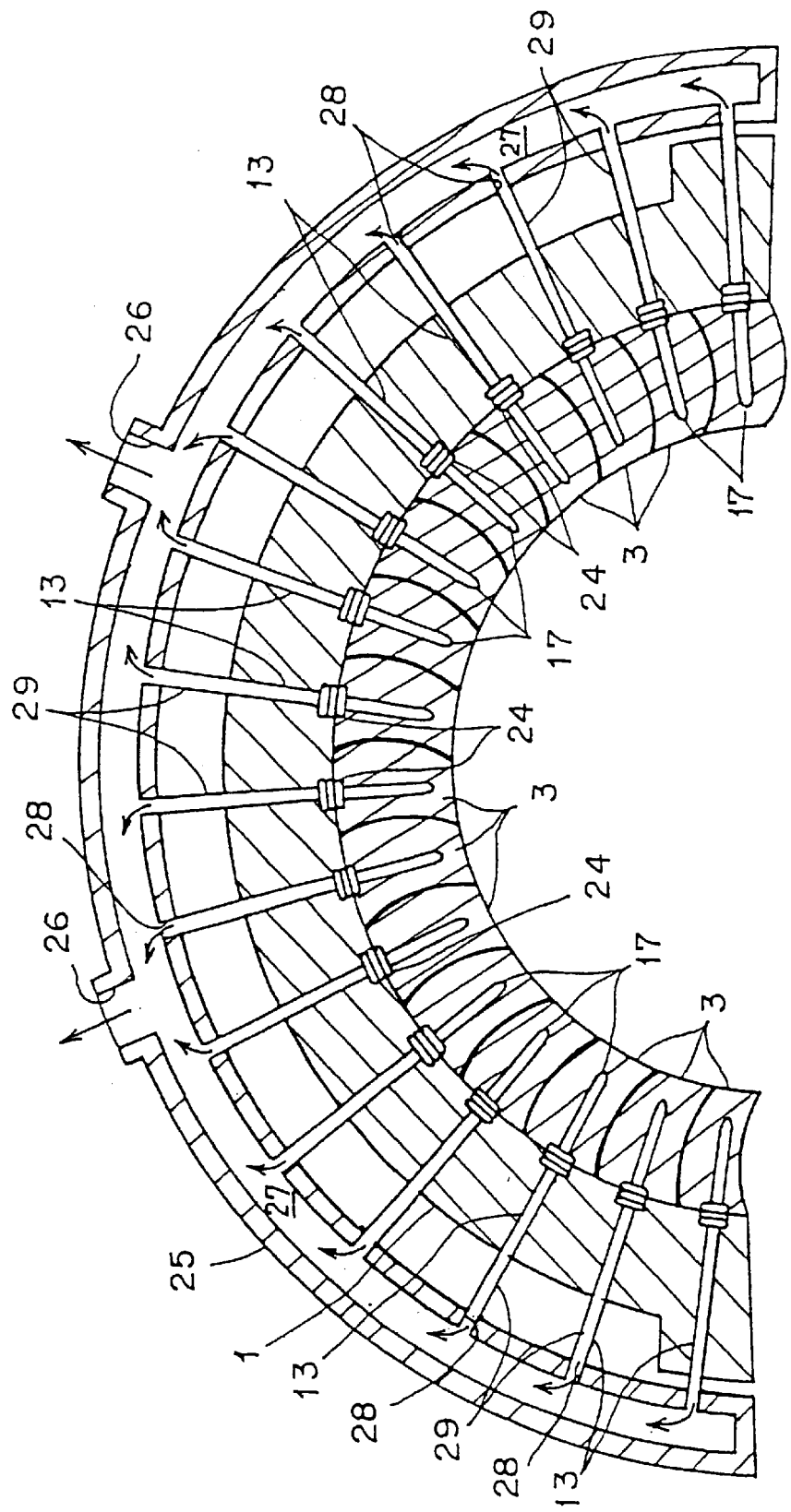
FIG. 4 is a cross-sectional view taken along line IV—IV in FIG. 1.

As illustrated in FIG. 4, the communication passages 13 the number of which is sixteen are attached to the blade ring 1 having the one-half ring shape. The communication passages 13 and the cooling passages 17 of the rear-stage stator blade 3 are connected through a fourth flexible connecting pipe 24.

Returning to FIG. 1, a recovery ring 25 is placed on the outer circumference of the blade ring 1. The recovery ring 25 is constituted by members having a one-half ring shape that are combined longitudinally so as to be detachably attached to each other to form a ring shape. As illustrated in FIG. 4, the recovery ring 25 has a manifold structure constituted by two recovery opening passages 26, one recovery communication path 27 and 16 recovery branch passages 28 that are formed in the one-half ring shape.

The respective recovery passages 13 and the respective recovery branch passages 28 are connected to each other through recovery pipes 29. The recovery pipes 29 are respectively provided with a temperature measuring unit 30. Consequently, each temperature unit 30 is placed in a single passage (recovery pipe 29) connecting the cooling passages 16 of the front-stage stator blade 2, one communication passage 12 and the cooling passages 17 of the rear-stage stator blade 3.

As illustrated in FIGS. 2 and 3, the warming-up and cooling use passage 14 has a manifold structure constituted by two warming-up and cooling use passages 31, one warming-up and cooling communication path (warming up passage) 32 and warming up and cooling branch passages 33 that are formed in the blade ring 1 having the one-half ring shape. The warming-up and cooling communication path 32 is formed in a portion of the blade ring 1 facing the front-stage moving blade 7.

Figure 5:
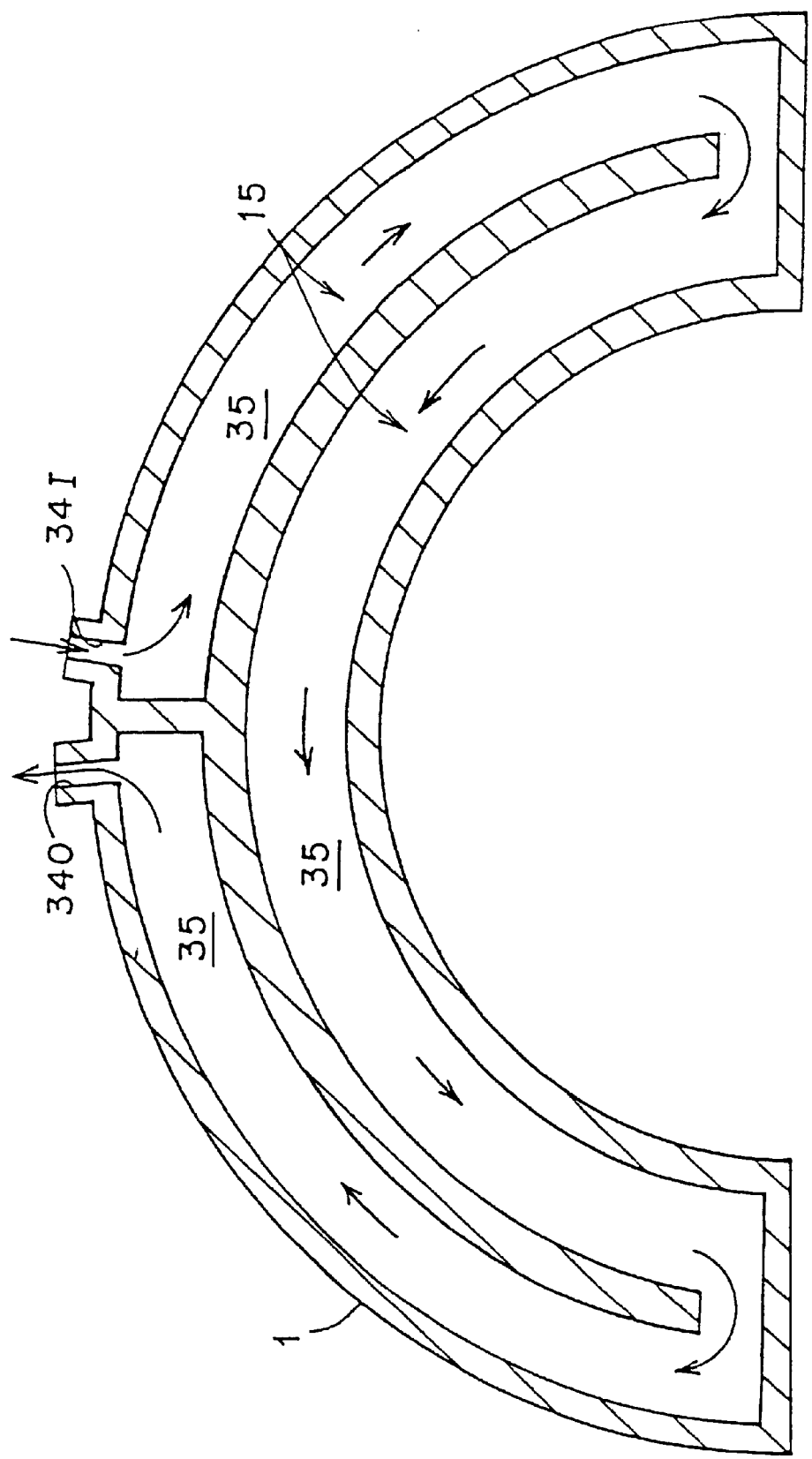
FIG. 5 is a cross-sectional view taken along line V—V in FIG. 1.

As illustrated in FIG. 5, the warming-up passage 15 has a manifold structure constituted by one warming-up inlet passage 34I, one warming-up outlet passage 34O and one warming-up communication passage (warming-up passage) 35 that are formed in the blade ring 1 having the one-half ring shape. The warming-up communication path 35 is formed in a part of the blade ring 1 facing the rear-stage moving blade 8.

In FIG. 1, reference numeral 36 shows each of tail cylinders of a combustor (not shown). The tail cylinders 36 the number of which is 16 are arranged in front of the front-stage stator blade 2 in a ring shape. Cooling pipes (cooling passages) 37 are respectively connected to the tail cylinders 36. The respective cooling pipes 37 and the respective warming-up and cooling branch passages 33 are connected to each other.

Figure 6:
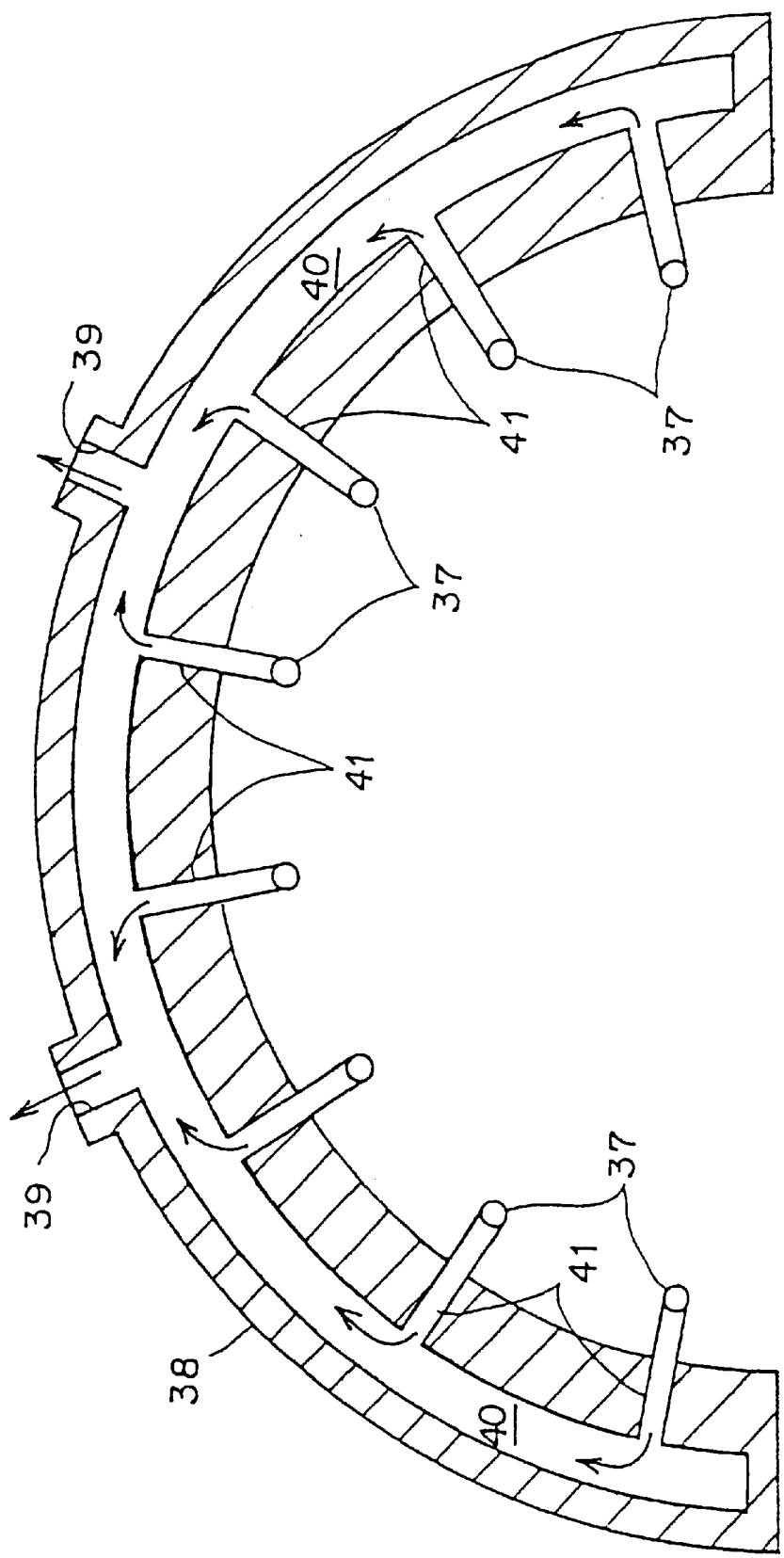
FIG. 6 is a cross-sectional view taken along line VI—VI in FIG. 1.

As illustrated in FIG. 1, a cooling recovery ring 38 is placed on the periphery of the blade ring 1. The cooling recovery ring 38 is constituted by two members that are combined longitudinally so as to be detachably attached to each other to form a ring shape. As illustrated in FIG. 6, the cooling recovery ring 38 has a manifold structure constituted by two cooling recovery opening passages 39, one cooling recovery communication path 40 and 8 cooling recovery branch passages 41 that are placed in one-half ring shape. The respective cooling recovery branch passages 41 and the respective cooling pipes 37 are connected to each other.

Figure 7:
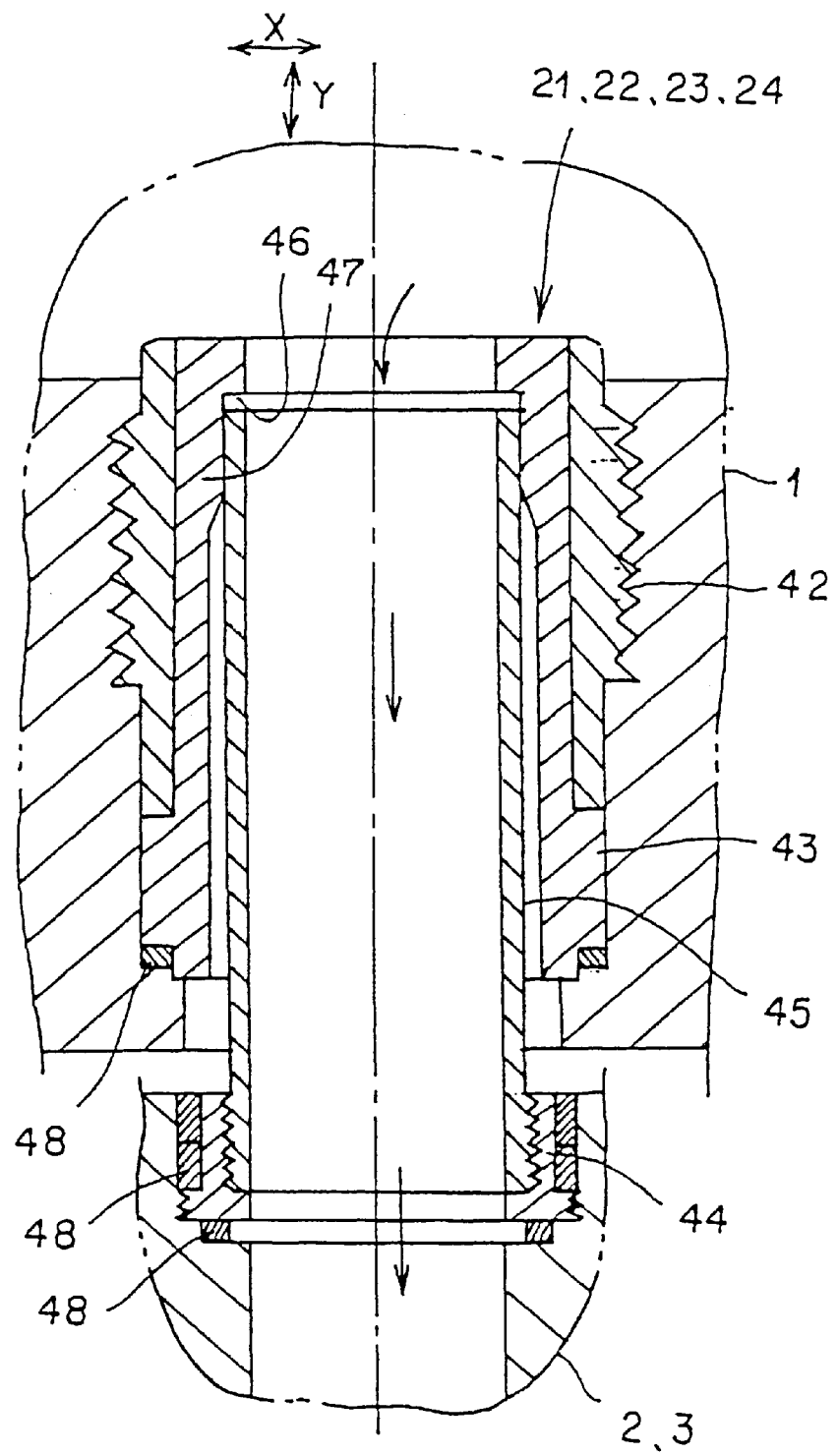
FIG. 7 is a cross-sectional view that shows a flexible pipe in VII section in FIG. 1.

As illustrated in FIG. 7, each of the first to fourth flexible pipes 21 to 24 is provided with a first threaded tube 42 that is secured to the blade ring 1, an outer tube 43 that is secured to the blade ring 1 by the first threaded tube 42, the front-stage stator blade 2, a second threaded tube 44 engaged in the rear-stage stator blade 3 and an inner tube 45 that is engaged in the second threaded tube 44.

A contacting protrusion 47 is placed on the inner face on one end side of the outer tube 43 through a step portion 46. The contacting protrusion 47 of the outer tube 43 and the outer surface of the inner tube 45 are allowed to contact each other in an air-tight state. Metal sheets (metal gaskets) 48 are respectively interpolated between the outer tube 43 and the blade ring 1 as well as between the second threaded tube 44 and the front-stage stator 2, the rear-state stator 3.

Between the casing 4 and the supported members on the casing 4, for example, the blade ring 1, the recovery ring 25 and the cooling recovery ring 38, steam pipes 49 having a flexible structure are placed. In other words, the steam pipes 49 are respectively connected to the four supply opening passages 18 of the blade ring 1, the four warming-up and cooling opening passage 31, the two warming-up inlet passages 34I, two warming-up outlet passages 34O, four recovery outlet passages 27 of the recovery ring 25 and four cooling recovery opening passages 39 of the cooling recovery ring 38.

Figure 8:
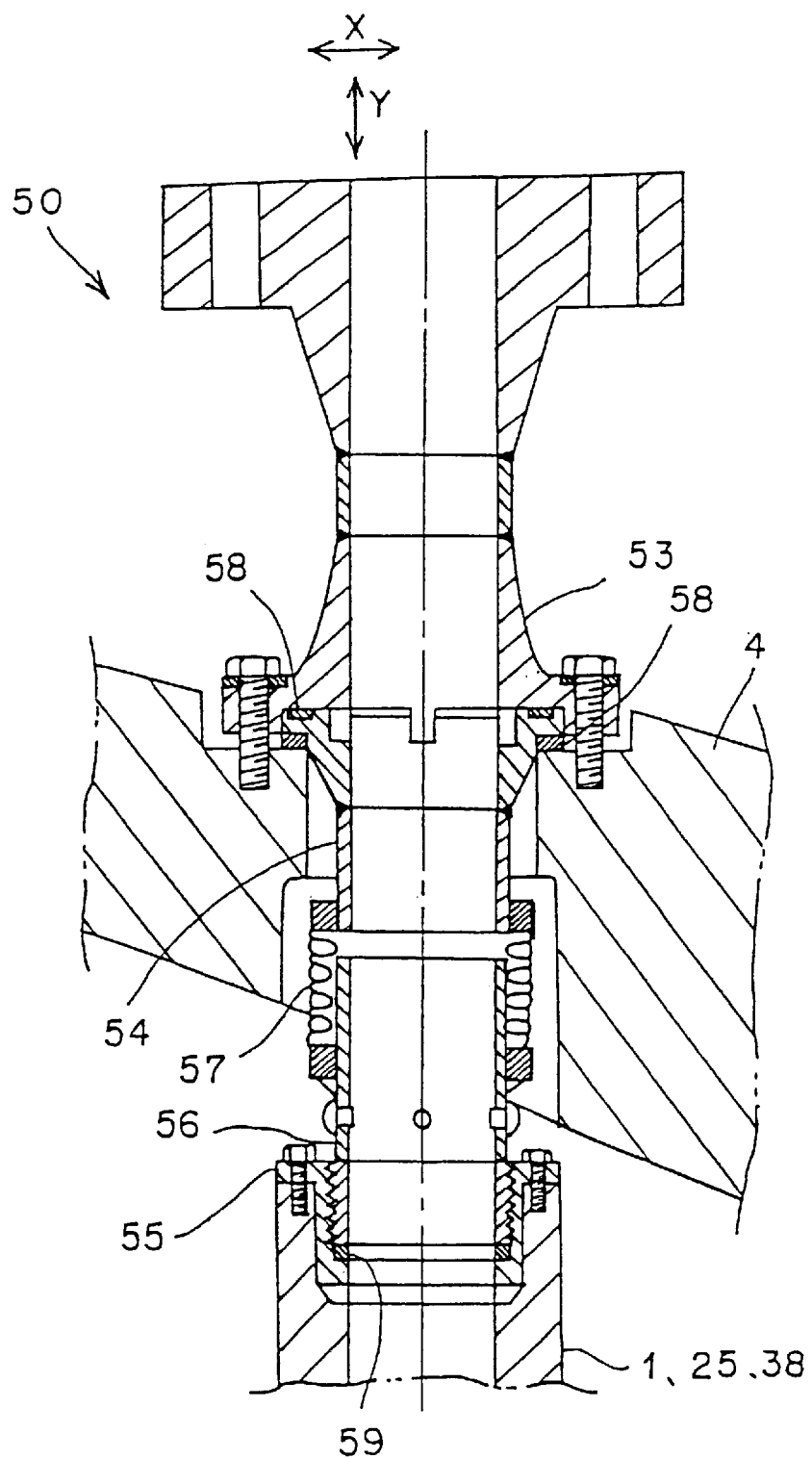
FIG. 8 is a cross-sectional view that shows a steam pipe having a bellows structure in VIII section in FIG. 1.
Figure 9:
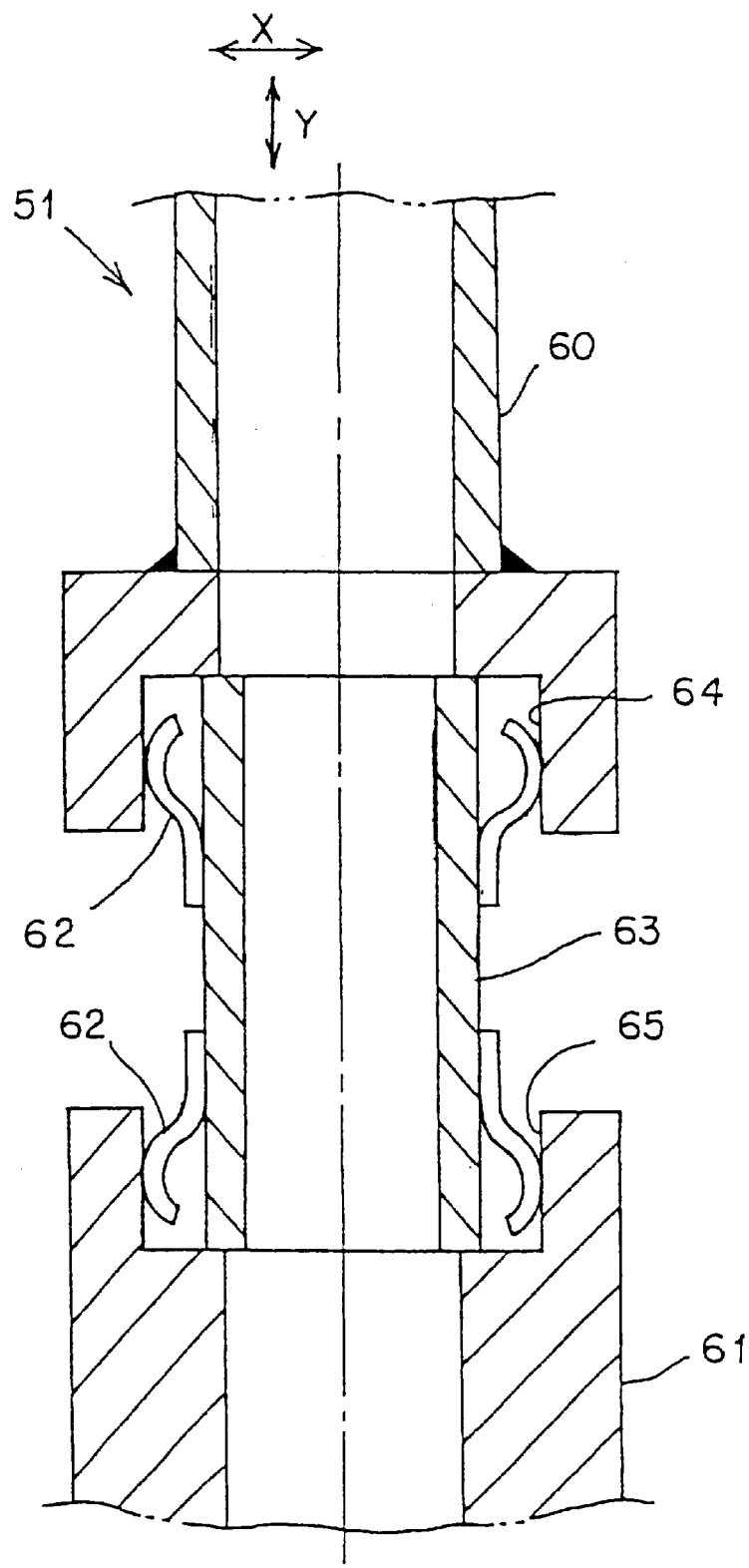
FIG. 9 is a cross-sectional view that shows a steam pipe having a tube seal structure in VIII section in FIG. 1.
Figure 10A:
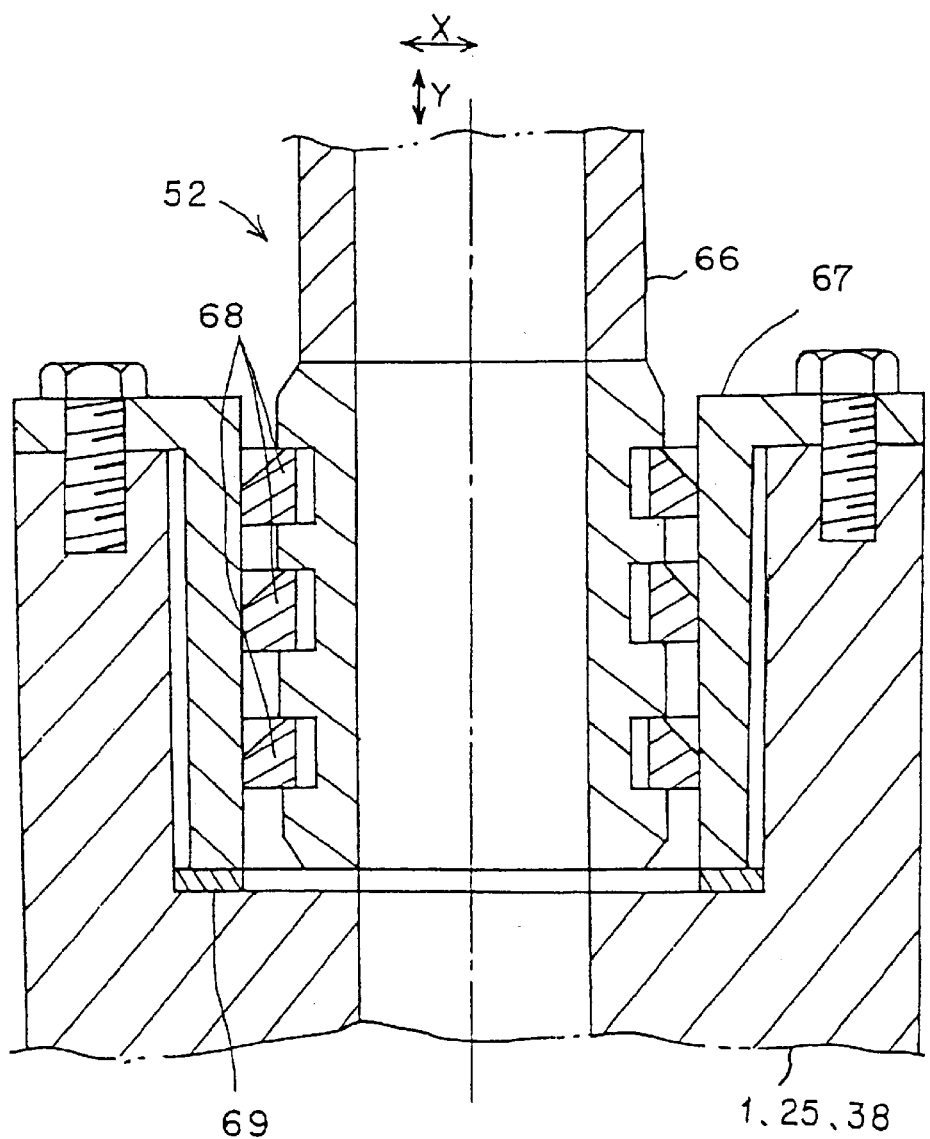
FIG. 10(A) is a cross-sectional view that shows a steam pipe having a piston ring structure in VIII section in FIG. 1.
Figure 10B:
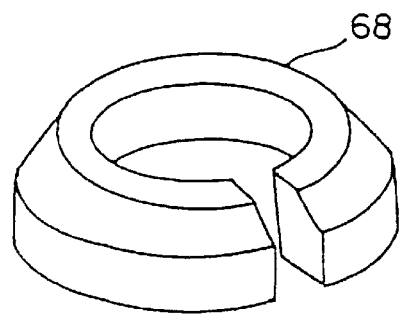
FIG. 10(B) is a perspective view of the piston ring.

The steam pipes 49 may have a bellows structure 50 shown in FIG. 8, a tube seal structure 51 shown in FIG. 9 and a piston ring structure 52 shown in FIG. 10.

The steam pipe 50 having the bellows structure is constituted by a fixed tube 53 secured to the casing 4 with bolts, a first connecting pipe 54 secured to the casing 4 by the fixed tube 53, the blade ring 1, the recovery ring 25, the threaded tubes 55 secured to the opening passages 18, 31, 34I, 34O, 27 and 39 of the cooling recovery ring 38, the second connecting pipes 56 engaged in the threaded tubes 55 and a bellows tube 57 the two ends of which are secured to the first connecting pipe 54 and the second connecting pipe 56.

The fixed tube 53 is formed by welding three tubes. The fixed tube 53 is connected to the steam supply source such as a boiler and the steam recovery source through pipes. The first connecting pipe 54 is formed by welding two pipes. Metal seals (metal gaskets) 58 are interpolated between the first connecting pipe 54 and the casing 4 as well as between the first connecting pipe 54 and the fixing tube 53. The second connecting pipe 56 is formed by welding two pipes. A metal seal (metal gasket) 59 having a C-letter shape in its cross-section is interpolated between the second connecting pipe 56 and the threaded tube 55.

The steam pipe 51 having the tube seal structure is constituted by a first connecting pipe 60 secured to the casing 4, a second connecting pipe 61 connected to the blade ring 1, the recovery ring 25 and the cooling recovery ring 38, and a tube 63 the two ends of which are connected to the first connecting pipe 60 and the second connecting pipe 61 through springs 62.

Recessed sections 64 and 65 are formed in the first connecting pipe 60 and the second connecting pipe 61. Moreover, the springs 62 are respectively secured to the peripheral portions of the two ends of the tube 63. The springs 62 are respectively allowed to elastically contact the inner face of the recessed section 64 of the first connecting pipe 60 and the inner face of the recessed section 65 of the second connecting pipe 61.

The steam pipe 52 having the piston ring structure is constituted by a first connecting pipe 66 secured to the casing 4, the blade ring 1, the recovery ring 25, a second connecting pipe 67 secured to the cooling recovery ring 38 with bolts and three piston rings 68 that are interpolated between the first connecting pipe 66 and the second connecting pipe 67.

Three ring-shaped grooves 69 are formed on the periphery of the first connecting pipe 66. The piston rings 68 are respectively fitted and secured to the grooves 69. The three piston rings 68 are allowed to elastically contact the inner face of the second connecting pipe 67. Metal seals (metal gaskets) 69 are interpolated between the second connecting pipe 67 and the respective members such as the blade ring 1, the recovery ring 25 and the cooling recovery ring 38.

The steam-cooling-type gas turbine of the first embodiment has the arrangement as described above, and the following description will discuss the functions thereof.

Cooling steam, indicated by a solid-line arrow in the figure, is supplied to the supply passage 11 through the steam pipe 49. Then, as illustrated in FIGS. 1 and 2, the cooling steam is branched by the supply inlet passage 18, the supply communication passage 19 and the supply branch passage 20 of the supply passage 11, and respectively distributed to the cooling passages 16 of the plurality of the front-stage stator blade 2 through the first flexible connecting pipe 21. The cooling steam thus distributed is allowed to cool the front-stage stator blade 2 through the respective cooling steam passage 16.

As illustrated in FIG. 1 and FIG. 3, the cooling steam that has cooled the front-stage stator blade 2 is distributed to the respective cooling passages 17 of the plurality of the rear-stage stator blade 3 through the second flexible connecting pipe 22, the communication passage 12 having the single-through construction and the third flexible connecting pipe 23. The cooling steam thus distributed is allowed to cool the plurality of the rear-stage stator blade 3 through the respective cooling steam passage 17.

As illustrated in FIG. 1 and FIG. 4, the cooling steam that has cooled the rear-stage stator blade 3 is concentrated in the fourth flexible pipe 24, the recovery passage 13, the recovery pipe 29, the recovering branch passage 28 and the recovery communication passage 27, and then recovered through the recovery opening passage 26 and the steam pipe 49. The steam thus recovered, is recycled.

Moreover, during a warm-up driving state, warming-up steam, indicated by a solid line arrow in the figure is supplied to the warming-up and cooling use passage 14 through the steam pipe 49. Then, as illustrated in FIGS. 1, 2 and 3, the warming-up steam is supplied to the warming-up and cooling communication path 32 through the warming-up and cooling opening passage 31. The portion on the periphery of the warming-up and cooling communication path 32, that is, the portion of the blade ring 1 facing the front-stage moving blade 7, is warmed up so that a clearance 9 is maintained between the blade ring 1 and the front-stage moving blade 7. For this reason, it is possible to prevent a so-called hugging phenomenon in which during the warming-up driving state, the blade ring 1 shrinks to come into contact with the front-stage moving blade 7.

During a rated driving state, cooling steam indicated by a solid line in the figure is supplied to the warming-up and cooling use passage 14 through the steam pipe 49. Then, as illustrated in FIGS. 1, 2 and 3, the cooling steam is supplied to the warming-up and cooling communication path 32 through the warming-up and cooling opening passage 31. The portion on the periphery of the warming-up and cooling communication path 32, that is, the portion of the blade ring 1 facing the front-stage moving blade 7, is cooled so that the clearance 9 is maintained between the blade ring 1 and the front-stage moving blade 7. For this reason, it is possible to prevent the blade ring 1 from extending to cause the clearance 9 to the front-stage moving blade 7 to become greater and resulting in degradation in the turbine efficiency, during the rated driving state.

As illustrated in FIGS. 1, 2 and 6, the steam supplied to the warming-up and cooling communication path 32 is branched by the warming-up and cooling branch path 33, and supplied to the cooling pipe 37 to cool the tail cylinder 36. The steam thus cooled the tail cylinder 36 is concentrated in the cooling pipe 37, the cooling recovery branch passages 41 and the cooling recovery communication passage 40, and recovered through the cooling recover opening passage 39 and the steam pipe 49. The steam thus recovered is recycled.

Moreover, during a warm-up driving state, warming-up steam, indicated by a solid line arrow in the figure is supplied to the warming-up passage 15 through the steam pipe 49. Then, as illustrated in FIGS. 1 and 5, the warming-up steam is supplied to the warming-up communication path 35 through the warming-up inlet passage 34I. The portion on the periphery of the warming-up communication path 35, that is, the portion of the blade ring 1 facing the rear-stage moving blade 8, is warmed up so that a clearance 10 is maintained between the blade ring 1 and the rear-stage moving blade 8. For this reason, it is possible to prevent a so-called hugging phenomenon in which during the warming-up driving state, the blade ring 1 shrinks to come into contact with the rear-stage moving blade 8.

During a rated driving state, cooling steam indicated by a solid line in the figure is supplied to the warming-up passage 15 through the steam pipe 49. Then, as illustrated in FIGS. 1 and 5, the warming-up steam is supplied to the warming-up communication path 35 through the warming-up inlet passage 34I. The portion on the periphery of the warming-up communication path 35, that is, the portion of the blade ring 1 facing the rear-stage moving blade 8 is cooled so that the clearance 10 between the blade ring 1 and the rear-stage moving blade 8 is maintained. For this reason, it is possible to prevent the blade ring 1 from extending to cause the clearance 10 to the rear-stage moving blade 8 to become greater and resulting in degradation in the turbine efficiency, during the rated driving state.

Then, the steam supplied to the warming-up communication path 35 is recovered through the warming-up outlet passage 34O and steam pipe 49. The steam thus recovered is recycled.

In this manner, in the steam-cooling-type gas turbine according to the first embodiment, the number of the communication passages 12 is set to the same as the number of the front-stage stator blades 2 and the rear-stage stator blades 3, that is, 32, therefore, the many communication passages 12 are placed in the blade ring 1 densely. Therefore, in the blade ring 1, the temperature difference between the portion having the communication passages 12 and the portion without the communication passages 12 becomes smaller. This uniformed temperature distribution with a small temperature difference makes it possible to minimize the thermal deformation of the blade ring 1, thereby making it possible to provide uniform clearances 9, 10 between the fixed side such as the blade ring 1 and the rotary side members such as the front-stage moving blade 7 and the rear-stage moving blade 8.

In particular, in the steam-cooling-type gas turbine according to the first embodiment, even in the case of the blade ring 1 having an integral structure that is more susceptible to thermal deformation, it is possible to minimize the thermal deformation of the blade ring 1 having the integral structure, and consequently to provide uniform clearances 9, 10 between the blade ring 1 having the integral structure and the front-stage moving blade 7, the rear-stage moving blade 8.

Moreover, in the steam-cooling-type gas turbine according to the first embodiment, each temperature measuring unit 30 is placed in one passage, that is, the single through, connecting the cooling passage 16 of the front-stage stator blade 2, one communication path 12 and the cooling passage 17 of the rear-stage stator blade 3. With this arrangement, the steam-cooling-type gas turbine according to the first embodiment makes it possible to detect an abnormal temperature in the front-stage stator blades 2, the rear-stage stator blades 3, the cooling passages 16 of the front-stage stator blades 2, the communication passages 12 and the cooling passage 17 of the rear-stage stator blades 2, that is, a deformation, a failure or a damage in the stator blades 2, 3, and leakage and clogging of the respective passages 16, 12, 17.

Moreover, in the steam-cooling-type gas turbine according to the first embodiment, the supply passages 11, the communication passages 12 and the recovery passage 13 of the blade ring 1 and the cooling passages 16 and 17 of the plurality of the front-stage stator blades 2 and the rear-state stator blades 3 are connected to each other through the first to fourth flexible connecting pipes 21 to 24. Consequently, in the steam-cooling-type gas turbine of the first embodiment, the first to fourth flexible connecting pipes 21 to 24 make it possible to absorb and follow the difference in thermal extension and shrinkage between the blade ring 1 and the front-stage stator blades 2 and the rear-stage stator blades 3. This arrangement makes it possible to prevent leakage of steam between the blade ring 1 and the front-stage stator blades 2 as well as the rear-stage stator blades 3.

In particular, in the first embodiment, the contact protrusion 47 of the outer tube 43 and the outer face of the inner tube 45 are made in contact with each other in an air-tight manner so that it becomes possible to absorb and follow the difference in thermal extension and shrinkage in the following directions, the axis direction X (radial direction of the first to fourth flexible connecting pipes 21 through 24) of the rotor 6, the radial direction Y (axis direction of the first to fourth flexible connecting pipes 21 through 24) of the rotor 6, the circumferential direction (the radial direction of the first to fourth flexible connecting pipes 21 through 24 and also the perpendicular direction to the paper of FIG. 7) of the rotor 6, and the circumferential direction of the first to fourth flexible connecting pipes 21 to 24.

Moreover, in the steam-cooling-type gas turbine of the first embodiment, the warming-up and cooling communication passages 32 and the warming-up communication passages 35 are formed in the blade ring 1. Consequently, in the steam-cooling-type gas turbine of the first embodiment makes it possible to control the clearances 9, 10 between the blade ring 1 and the front-stage moving blade 7 as well as the rear-stage moving blade 8 by allowing warming-up steam through the warming-up and cooling communication passages 32 and the warming-us communication passages 35 of the blade ring 1 during the warming-up driving state before the rated driving. Moreover, the cooling steam and the warming-up steam are commonly used so that the structure of the supply, passage and recovery of steam is unified and made into a compact structure.

Moreover, in the steam-cooling-type gas turbine of the first embodiment, the cooling pipes 37 installed in the tail cylinder 35 of the combustor and the warming-up and cooling use passage 14 of the blade ring 1 are allowed to communicate with each other through the warming-up and cooling branch passage 33. With this arrangement, in the steam-cooling type gas turbine according to the first embodiment, the steam for cooling the tail cylinder 36 and the steam for warming up the blade ring 1 are commonly used so that the structure of the supply, passage and recovery of steam is unified and made into a compact structure.

Moreover, in the steam-cooling-type gas turbine according to the first embodiment, the steam pipe 49 having the flexible structure is placed between the casing 4 and the supported members (for example, the blade ring 1, the recovery ring 25, the cooling recovery ring 38) supported by the casing 4. With this arrangement, in the steam-cooling-type gas turbine according to the first embodiment, the steam pipe 49 having the flexible structure makes it possible to absorb and follow the difference in thermal extension and shrinkage between the supported members (the blade ring 1, the recovery ring 25, the cooling recovery ring 38) and the casing 4. With this arrangement, it is possible to prevent leakage of steam between the supported members (the blade ring 1, the recovery ring 25, the cooling recovery ring 38) and the casing 4. In particular, as in the case of the first embodiment, when the blade ring 1 has an integral structure that is more susceptible to thermal deformation, this arrangement is preferably applied.

In particular, in the first embodiment, the steam pipe 50 having a bellows structure is provided with the bellows tube 57 placed between the first connecting pipe 54 secured to the casing 4 and the second connecting pipe 56 secured to the supported members (the blade ring 1, the recovery ring 25, the cooling recovery ring 38), thus, the bellows tube 57 makes it possible to absorb and follow the difference in thermal extension and shrinkage in the following directions, the axis direction (radial direction of the steam pipe 50) X of the rotor 6, the radial direction (the axis direction of the steam pipe 50) Y of the rotor 6, the circumferential direction of the rotor 6 (the radial direction of the steam pipe 50 and also the perpendicular direction to the paper of FIG. 8) and the circumferential direction of the steam pipe 50.

Moreover, in the first embodiment, the steam pipe 51 having the tube seal structure, the inner face of the recessed section 64 of the first connecting pipe 60 secured to the casing 4 and the inner face of the recessed section 66 of the second connecting pipe 62 secured to the supported members (the blade ring 1, the recovery ring 25, the cooling recovery ring 38) are allowed to elastically contact the spring 62 on the outer face of the tube 63, thus, this arrangement makes it possible to absorb and follow the difference in thermal extension and shrinkage in the following directions, the axis direction (radial direction of the steam pipe 51) X of the rotor 6, the radial direction (the axis direction of the steam pipe 51) Y of the rotor 6, the circumferential direction of the rotor 6 (the radial direction of the steam pipe 51 and also the perpendicular direction to the paper of FIG. 9) and the circumferential direction of the steam pipe 51.

Furthermore, in the first embodiment, the steam pipe 52 having the piston ring structure, the piston ring 68 that is fitted and secured to the peripheral portion of the first connecting pipe 66 secured to the casing 4 is allowed to elastically contact the inner circumference of the second connecting pipe 67 secured to the supported members (the blade ring 1, the recovery ring 25, the cooling recovery ring 38), thus, this arrangement makes it possible to absorb and flow the difference in thermal extension and shrinkage in the following directions, the axis direction (radial direction of the steam pipe 52) X of the rotor 6, the radial direction (the axis direction of the steam pipe 52) Y of the rotor 6, the circumferential direction of the rotor 6 (the radial direction of the steam pipe 52 and also the perpendicular direction to the paper of FIG. 10) and the circumferential direction of the steam pipe 52.

Figure 11:
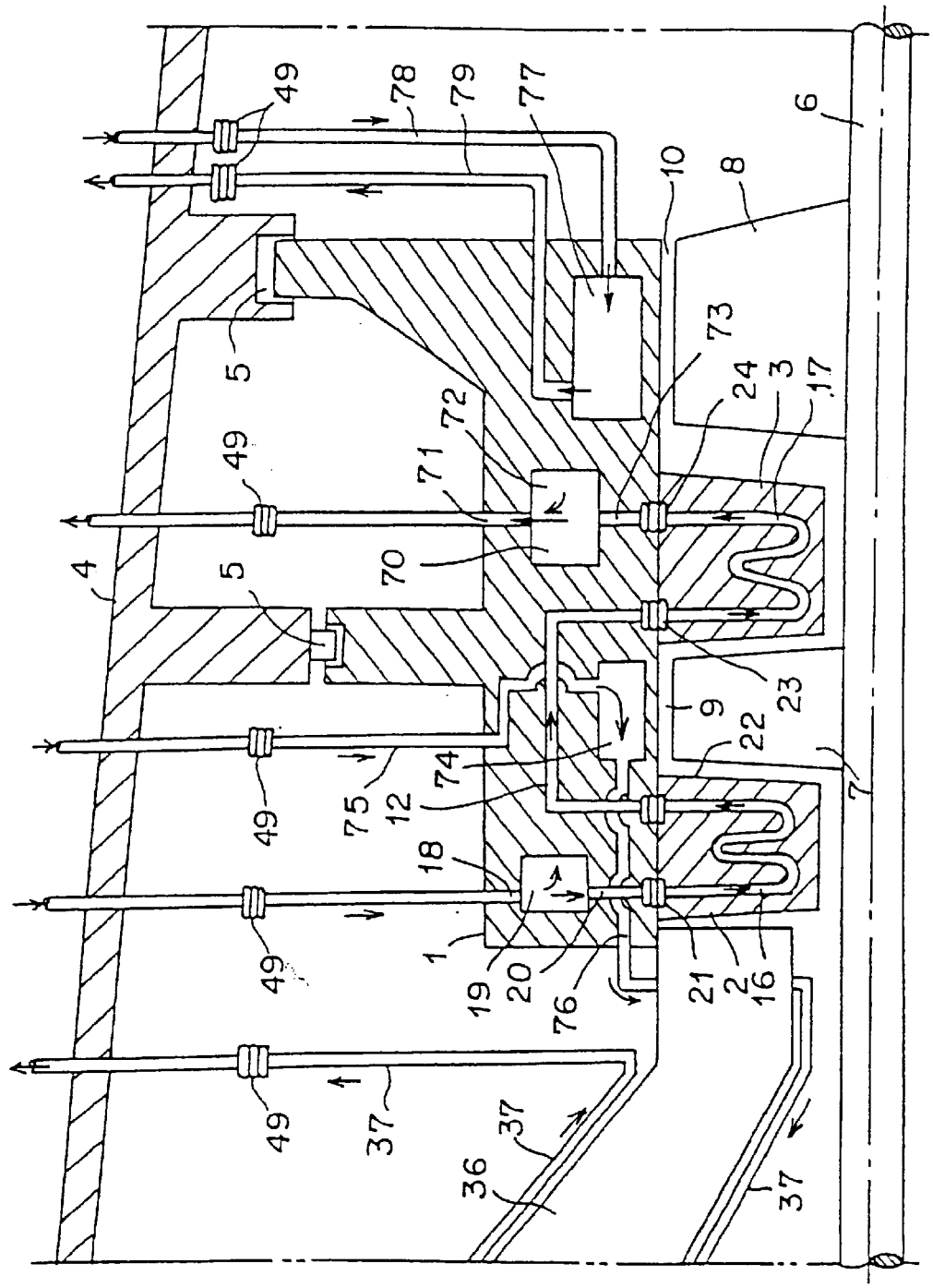
FIG. 11 is a partial longitudinal cross-sectional view that shows an outline of a second embodiment of a steam-cooling-type gas turbine according to the present invention.
Figure 12:
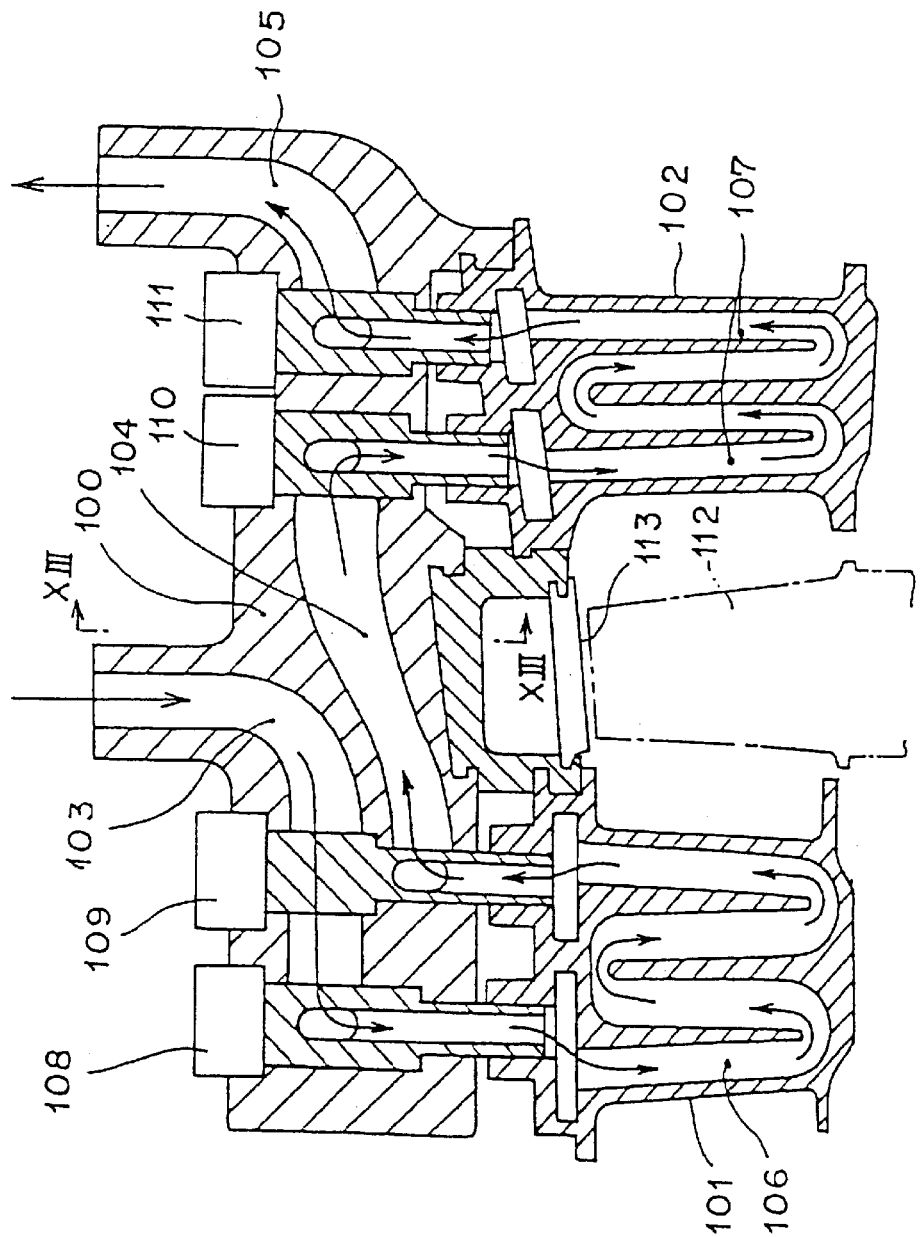
FIG. 12 is a partial longitudinal cross-sectional view that shows an outline of a conventional steam-cooling-type gas turbine.
Figure 13:
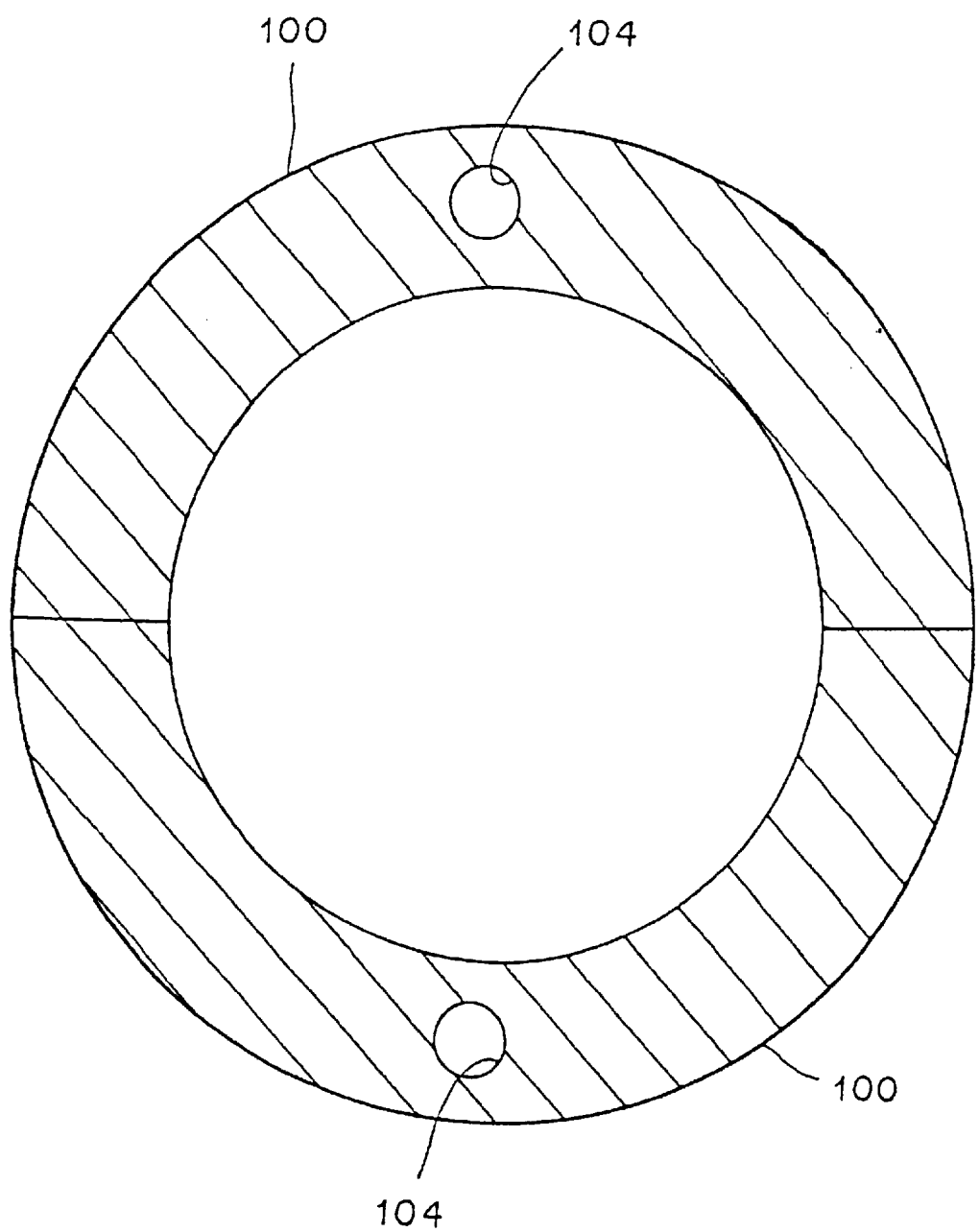
FIG. 13 is a cross-sectional view taken along line XIII—XIII in FIG. 12.

FIG. 11 shows a second embodiment of a steam-cooling-type gas turbine according to the present invention. The second embodiment has an arrangement in which the recovery ring 25 of the first embodiment is integrally formed into the blade ring 1. In other words, a recovery passage 70 is formed in the blade ring 1. Although it is placed on the recovery side instead of the supply side, the recovery passage 70 has virtually the same construction as the supply passage 11 of the first embodiment (see FIG. 2).

The recovery passage 70 has a manifold structure constituted by two recovery opening passages 71, one recovery communication passage 72 and 16 recovery branch passages 73 that are installed in a blade ring 1 having a one-half ring shape. The recovery branch passages 73 and the cooling passages 17 of the rear-stage stator blade 3 are connected to each other through the fourth flexible connecting pipes 24.

In the second embodiment, the temperature measuring unit is installed in any of the single-through constituted by the supply branch passage 20, the cooling passage 16, the communication passage 12, the cooling passage 17 and the recovery branch passage 73.

Moreover, in the second embodiment, the warming-up and cooling use passage 14, the cooling recovery ring 38 and the warming-up passage 15 of the first embodiment are not formed into a manifold structure. In other words, eight warming-up and cooling use passages 74 are formed in the blade ring 1 of the one-half ring shape, and a warming-up and cooling inlet pipe 75 and a warming-up and cooling outlet pipe 76 are respectively formed in the warming-up and cooling use passage 74.

The sixteen warming-up and cooling outlet pipes 76 and sixteen tail cylinder cooling pipes 37 are connected to each other. The sixteen cooling pipes 37 and the warming-up and cooling inlet pipe 75 are placed outside of the casing 4 through the steam pipe 49.

One or a plurality of warming-up passages 77 are installed in the blade ring 1 having the one-half ring shape, and a warming-up inlet pipe 78 and a warming-up outlet pipe 79 are respectively placed in the warming-up passages 77. One or a plurality of warming-up inlet pipes 78 and warming-up outlet pipes 79 are placed outside the casing 4 through the steam pipe 49 of the flexible structure.

The second embodiment makes it possible to achieve virtually the same functions and effects as the aforementioned first embodiment.

In the first and second embodiments, the blade ring 1 has an integral structure. However, the steam-cooling-type gas turbine of the present invention may have a blade ring having a separate structure.

Moreover, in the first and second embodiments, the warming-up steam to the front-stage moving blade 8 and the cooling steam to the tail cylinder 36 are commonly used. However, in the steam-cooling-type gas turbine of the present invention, the warming-up steam to the front-stage moving blade 8 and the cooling steam to the tail cylinder 36 may be provided in a separate manner.

As clearly described above, the steam-cooling-type gas turbine of the present invention is provided with the communication passages the number of which is the same as that of the front-stage stator blades and the rear-stage stator blades are placed so that more communication passages are closely arranged on the fixed side having the blade ring, etc. Consequently, on the fixed side having the blade ring, etc., the temperature difference between the portion having the communication passages and the portion without the communication passages becomes smaller. The evenly adjusted temperature distribution with a small temperature gap makes the thermal deformation on the fixed side having the blade ring, etc. smaller, thereby providing an evenly adjusted clearance between the fixed side having the blade ring, etc. and the moving blade on the rotary side.

Moreover, the steam-cooling-type gas turbine is provided with the blade ring having an integral structure in which a plurality of communication passages are respectively placed in the blade ring having the integral structure. Therefore, even in the case of the blade ring integral structure that is more susceptible to thermal deformation, the thermal deformation of the blade ring having the integral structure is maintained smaller so that the clearance between the blade ring having the integral structure and the moving blade is evenly maintained.

Furthermore, each passage connecting each cooling passage of the front-stage stator blade, the one communication passage and each cooling passage of the rear-stage stator blade, that is, the single-through, is provided with a temperature measuring unit. Therefore, it becomes possible to detect an abnormal temperature in the cooling passage of the respective front-stage stator blades and the rear-stage stator blades, the cooling passage of the respective front-stage stator blade, the respective communication passages and the cooling passage of the respective rear-stage stator blades, that is, a deformation, a failure and a damage of the respective stator blades and leakage and clogging of the respective passages.

Moreover, the passage and the communication passage of the blade ring and the cooling passages of the front-stage stator blades and the rear-stage stator blades are connected to each other through a flexible connecting pipe. Therefore, the flexible connecting pipe makes it possible to absorb and follow the difference in thermal extension and shrinkage between the blade ring and the front-stage stator blades and the rear-stage stator blades. This arrangement makes it possible to prevent leakage of steam between the blade ring and the front-stage stator blade as well as the rear-stage stator blade.

Furthermore, a portion of the blade ring facing a moving blade is provided with a warming-up passage. Therefore, during a warming-up driving state prior to the rated driving operation, warming-up steam is allowed to pass through the warming-up passage of the blade ring so that the clearance between the blade ring and the moving blade can be controlled. Moreover, since the cooling steam and the warming-up steam are commonly used, the structures of the supply, passage and recovery system of steam are unified, thereby making it possible to provide a compact system.

Moreover, a cooling passage is provided in the tail cylinder of the combustor. Thus, since the cooling steam of the stator blade and the cooling steam of the tail cylinder are commonly used, the structures of the supply, passage and recovery system of steam are unified, thereby making it possible to provide a compact system.

Furthermore, the cooling passage of the tail cylinder and the warming-up passage of the blade ring are allowed to communicate with each other. Therefore, since the cooling steam of the tail cylinder and the steam for warming up the blade ring are commonly used, the structures of the supply, passage and recovery system of steam are unified, thereby making it possible to provide a compact system.

Moreover, a steam pipe having a flexible structure is placed between a casing and the supported members such as the blade ring on the casing. Therefore, the steam pipe having a flexible structure makes it possible to absorb and follow the difference in thermal extension and shrinkage between the supported members such as the blade ring and the casing. Thus, it becomes possible to prevent leakage of steam between the supported members such as the blade ring and the casing. In particular, this arrangement is effective for the device having the blade ring integral structure that is more susceptible to thermal deformation.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A steam-cooling-type gas turbine comprising:
   a blade ring on which a plurality of front-stage stator blades and rear-stage stator blades are arranged in a ring shape respectively;
   cooling passages formed in said front-stage stator blades and rear-stage stator blades, said cooling passages being injected with cooling steam to cool said front-stage stator blades and said rear-stage stator blades,
   wherein each of said cooling passages of said front-stage stator blades and each of said cooling passages of said rear-stage stator blades are allowed to communicate with each other through a communication passage in a one-to-one correspondence, and the communication passage and the cooling passages formed in the front-stage stator blades and the rear-stage stator blades are connected to each other through a flexible connecting pipe.

2. The steam-cooling-type gas turbine according to claim 1, wherein said blade ring having said front-stage stator blades aligned thereon and said blade ring having said rear-stage stator blades aligned thereon are formed into an integral structure, and in that each of the communication passages is formed in said blade ring having the integral structure.

3. The steam-cooling-type gas turbine according to claim 1, wherein each passage that connects each cooling passage of one of said front-stage stator blade, a corresponding one of said communication passage, and each cooling passage of one of said rear-stage stator blade is provided with a temperature measuring unit.

4. The steam-cooling-type gas turbine according to claim 1, wherein said passages in said blade ring have a manifold structure.

5. The steam-cooling-type gas turbine according to claim 1, further comprising:
   a casing that supports the blade ring; and
   a steam pipe having a flexible structure, wherein the steam pipe is placed between the casing and the blade ring.

6. A steam-cooling-type gas turbine comprising:
   a blade ring on which a plurality of front-stage stator blades and rear-stage stator blades are arranged in a ring shape respectively;
   cooling passages formed in said front-stage stator blades and rear-stage stator blades, said cooling passages being injected with cooling steam to cool said front-stage stator blades and said rear-stage stator blades,
   wherein each of said cooling passages of said front-stage stator blades and each of said cooling passages of said rear-stage stator blades are allowed to communicate with each other through a communication passage in a one-to-one correspondence, and a portion of said blade ring facing a moving blade is provided with a warming-up passage, with warming-up steam being directed through said warming-up passage.

7. A steam-cooling-type gas turbine comprising:
   a blade ring on which a plurality of front-stage stator blades and rear-stage stator blades are arranged in a ring shape respectively;
   cooling passages formed in said front-stage stator blades and rear-stage stator blades, said cooling passages being injected with cooling steam to cool said front-stage stator blades and said rear-stage stator blades,
   wherein each of said cooling passages of said front-stage stator blades and each of said cooling passages of said rear-stage stator blades are allowed to communicate with each other through a communication passage in a one-to-one correspondence, and a tail cylinder of a combustor is provided with a cooling passage for cooling the tail cylinder with cooling steam being directed there through.

8. The steam-cooling-type gas turbine according to claim 7, further comprising a warming-up and cooling use passage provided in the blade ring, wherein said cooling passage for cooling the tail cylinder and said warming-up and cooling use passage are allowed to communicate with each other.

* * * * *